United States Patent
Yamagata et al.

(10) Patent No.: US 8,035,696 B2
(45) Date of Patent: Oct. 11, 2011

(54) SOLID-STATE IMAGING APPARATUS AND IMAGING APPARATUS

(75) Inventors: Yuuki Yamagata, Kanagawa (JP); Ken Koseki, Kanagawa (JP); Masaru Kikuchi, Kanagawa (JP); Yoshiaki Inada, Tokyo (JP); Junichi Inutsuka, Nagasaki (JP); Akari Tajima, Nagasaki (JP)

(73) Assignee: Sony Corporation, Tokyo (JP)

( * ) Notice: Subject to any disclaimer, the term of this patent is extended or adjusted under 35 U.S.C. 154(b) by 770 days.

(21) Appl. No.: 12/024,195

(22) Filed: Feb. 1, 2008

(65) Prior Publication Data

US 2008/0186388 A1 Aug. 7, 2008

(30) Foreign Application Priority Data

Feb. 5, 2007 (JP) .................... 2007-025031

(51) Int. Cl.
*H04N 5/228* (2006.01)
*G09G 3/36* (2006.01)
(52) U.S. Cl. .................... 348/222.1; 345/94
(58) Field of Classification Search ........... 348/222.1, 348/138, 308; 345/94, 98, 100, 208
See application file for complete search history.

(56) References Cited

U.S. PATENT DOCUMENTS

| | | | |
|---|---|---|---|
| 6,344,877 B1 * | 2/2002 | Gowda et al. | 348/245 |
| 7,242,429 B1 | 7/2007 | Lee | |
| 7,286,109 B2 * | 10/2007 | Aoki | 345/94 |
| 2003/0117509 A1 | 6/2003 | Hara | |
| 2004/0164947 A1 | 8/2004 | Noda | |
| 2007/0008206 A1 * | 1/2007 | Tooyama et al. | 341/155 |

FOREIGN PATENT DOCUMENTS

| | | |
|---|---|---|
| EP | 1477691 | 11/2004 |
| EP | 1643754 | 4/2006 |
| EP | 1742369 | 1/2007 |
| JP | 63-198022 | 8/1988 |
| JP | 06-205309 | 7/1994 |
| JP | 08-264757 | 10/1996 |
| JP | 08-288494 | 11/1996 |
| JP | 2004-172267 | 6/2004 |
| JP | 2005-278135 | 10/2005 |
| JP | 2006-340044 | 12/2006 |

OTHER PUBLICATIONS

Japanese Office Action issued on Jan. 6, 2009 corresponding to JP 2007-025031.
Summons to attend oral proceedings dated May 20, 2009 in connection with EP Application No. 08 002 056.3.
EP Communication dated Jun. 18, 2008 for Application No. 08002056.2-2202.

* cited by examiner

*Primary Examiner* — Lin Ye
*Assistant Examiner* — Trung Diep
(74) *Attorney, Agent, or Firm* — SNR Denton US LLP

(57) ABSTRACT

A solid-state imaging apparatus includes comparing means for comparing a pixel signal obtained by a pixel section and a reference signal the value of which varies in a stepwise manner, analog-digital converting means for outputting, as a digital value, the amount of time when the pixel signal and the reference signal change levels by the comparing means, reset signal generating means for generating a reset signal that triggers a reset operation to be input to the comparing means in order to adjust the reference in the analog-digital converting means, and waveform processing means provided between the reset signal generating means and the comparing means for increasing the degree of dullness of a waveform of the reset signal.

15 Claims, 12 Drawing Sheets

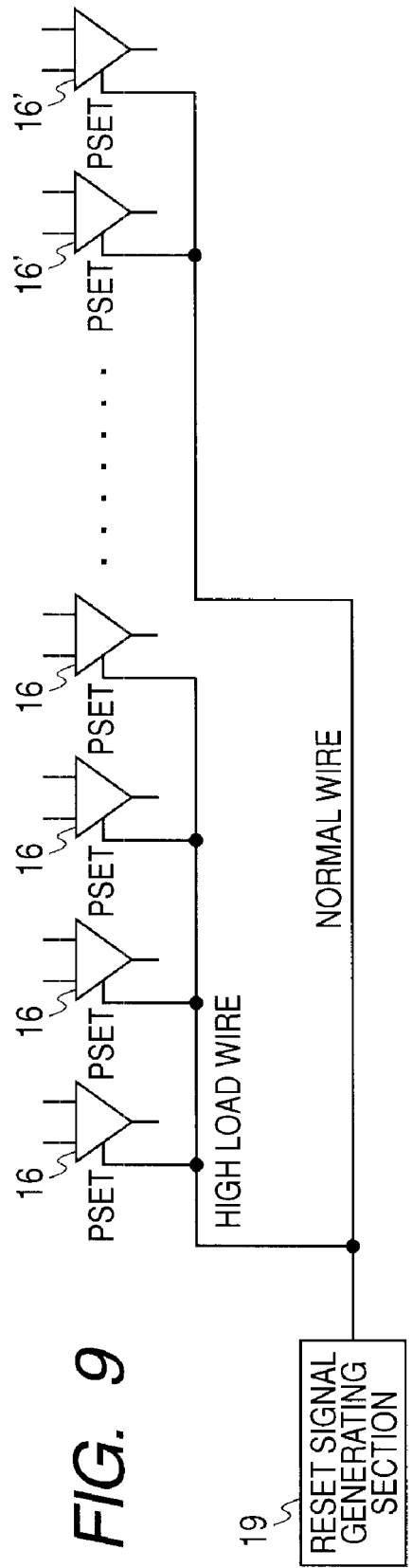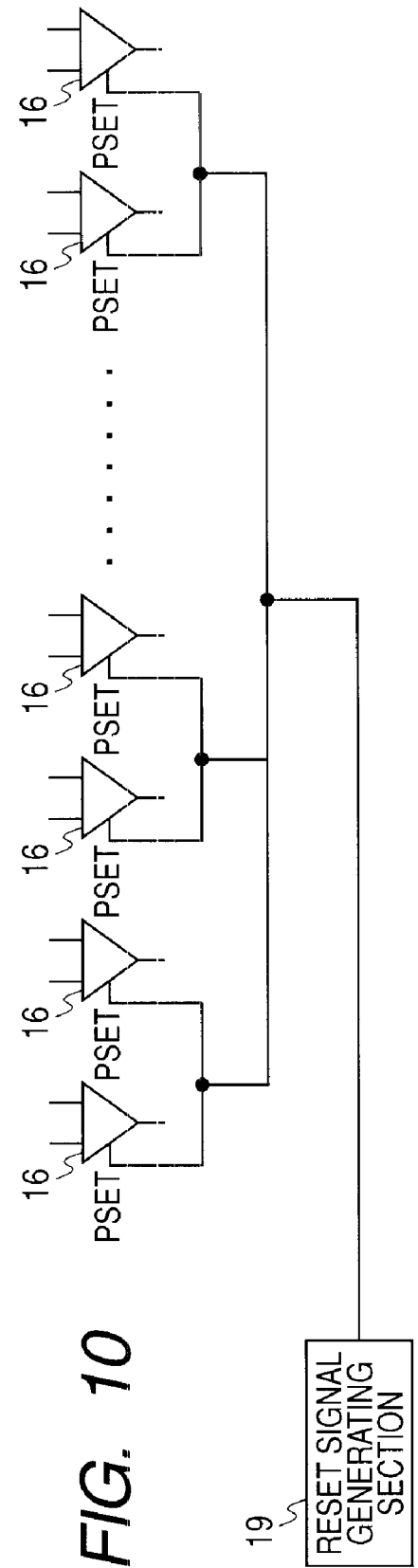

Prior Art FIG. 14
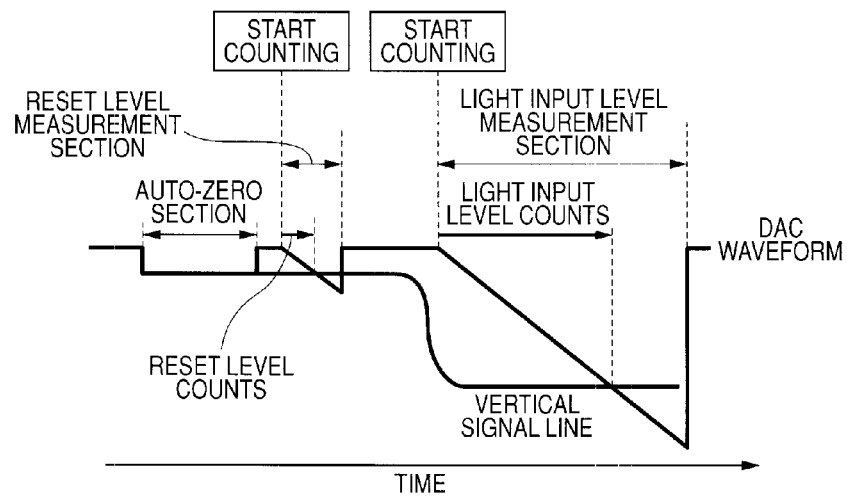
Prior Art FIG. 15
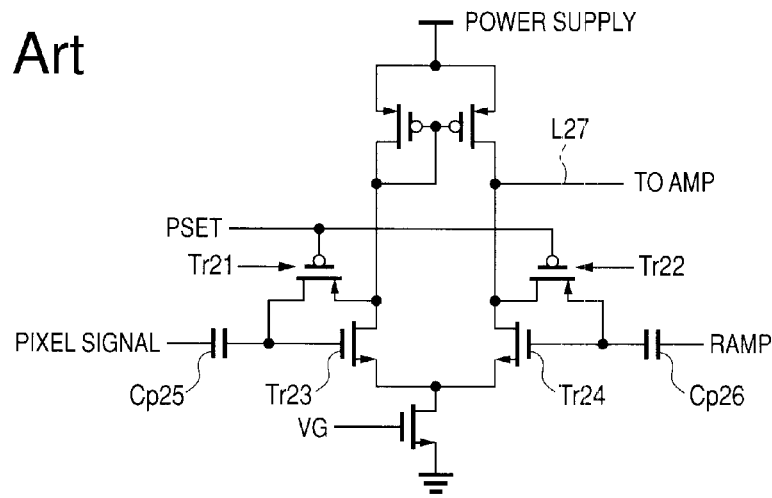

Prior Art    FIG. 16
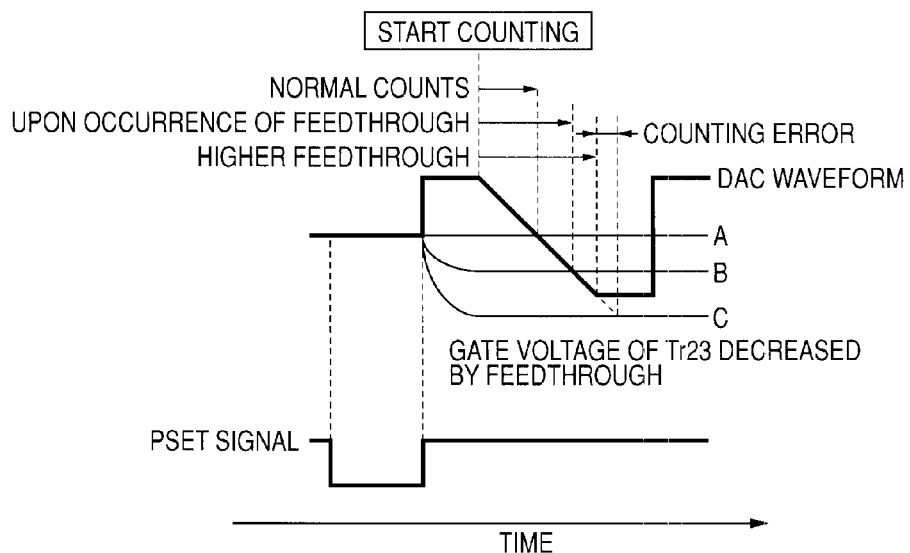
Prior Art    FIG. 17
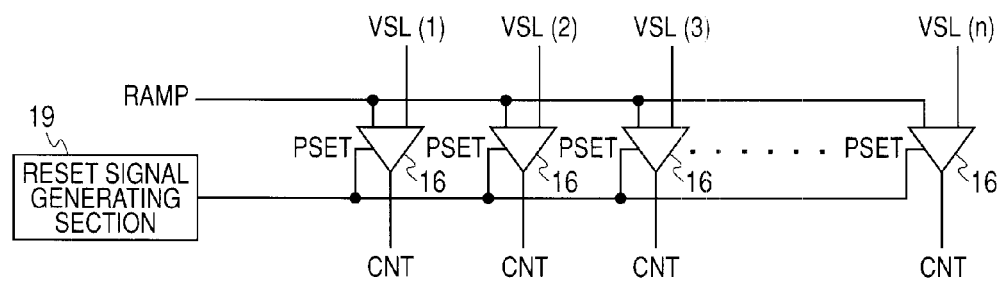

SOLID-STATE IMAGING APPARATUS AND IMAGING APPARATUS

CROSS REFERENCES TO RELATED APPLICATIONS

The present invention contains subject matter related to Japanese Patent Applications JP 2007-025031 filed in the Japanese Patent Office on Feb. 5, 2007, the entire contents of which being incorporated herein by reference.

BACKGROUND OF THE INVENTION

1. Field of the Invention

The present invention relates to a solid-state imaging apparatus and imaging apparatus, which compare a pixel signal and a reference signal that varies in a stepwise manner and obtains a digital value from an amount of time for the change of the levels of their voltage.

2. Description of the Related Art

Presently, a solid-state imaging apparatus such as a CCD (Charge Coupled Device) and a CMOS (Complementary Metal Oxide Semiconductor) has been used for various applications. Recently, a MOS (Metal Oxide Semiconductor) type solid-state imaging apparatus suitable for faster imaging has received attention, and various architectures have been proposed.

JP-A-2005-278135 (Patent Document 1) achieves a higher frame rate by using an up/down counter, without increasing the size of the circuit. FIG. 13 is a block diagram showing an embodiment of the MOS type solid-state imaging apparatus that employs the method.

That is, a solid-state imaging apparatus 1 includes a pixel array section 10, a row scanning circuit 13 and a column scanning circuit 14, a reference signal generating section (DAC) 15, a comparator 16, an up/down counter (U/D CN) 17, a buffer (BUF) 18, and a drive control section 21. In the pixel array section 10, unit pixels 12 are placed in a matrix form. The row scanning circuit 13 and column scanning circuit 14 drive the pixel array section 10. The reference signal generating section (DAC) 15 generates a reference voltage. The comparator 16 compares a vertical signal line voltage and a reference voltage. The up/downcounter (U/DCN) 17 performs both digital operation and storage. The buffer (BUF) 18 temporarily retains the values. The drive control section 21 controls all of those components.

The reference signal generating section 15 and the comparator 16 and up/down counter 17 at each column are included in an A/D converting circuit Ramp DAC in the scheme and converts an analog signal obtained from a pixel to a digital value. The A/D converting circuit compares a pixel signal and a reference signal the value of which varies in a stepwise manner in the comparator and obtains the digital value by counting the amount of time for changing the levels of their voltages.

Many MOS type imaging apparatus obtain a vertical signal line voltage level upon reset of a pixel, then obtain the voltage level of the vertical signal line when light is input, and obtain the difference between them to perform an operation of removing fixed pattern noise.

In the solid-state imaging apparatus 1 case, the up/down counter 17 is used to remove the fixed pattern. First, in order to perform D/A conversion at the reset level of a pixel, the counter counts minus levels. Next, in order to perform D/A conversion upon input of light, the counter counts plus levels from the counts as the starting point. Thus, the difference can be obtained in the digital area, without any subtractor circuit (refer to FIG. 14).

The reference signal generating section, which generates a reference signal, is connected commonly to the comparators at all columns, and the counter is provided independently at each column. The digital data from which a fixed pattern has been removed is stored in the buffer 18 once and is sequentially transferred from the end column.

The comparator 16 employed in the solid-state imaging apparatus 1 may be a switched capacitor. FIG. 15 shows the circuit example. A switch transistor Tr21 is connected between the gate and drain of a transistor Tr23. A switch transistor Tr 22 is connected between the gate and drain of a transistor Tr 24.

A pixel signal is input to the transistor Tr 23 through a capacitor Cp 25, and a signal waveform from the reference signal generating section is input to the transistor Tr 24 through a capacitor Cp 26. The comparator is a circuit that generates a High or Low output L27 according to the height of the voltage levels of the signals on the pixel signal side and the RAMP side.

It is important for the circuit to determine the criterion-of-judgment voltage for the comparison first. The operation of determining the voltage will be called "auto-zero" hereinafter. In order to perform the auto-zero, a vertical signal line reset level is input to the pixel signal side while a ramp reference signal is input to the reference signal generating section side.

A PSET signal for performing the auto-zero is commonly supplied to the gates of the switch transistors Tr 21 and Tr 22. FIG. 16 shows the timing of the PSET signal. The Tr 21 and Tr22 are turned on at the time when the PSET signal falls, and the comparator enters the auto-zero state. The operation point is determined when the gate voltages of the Tr 23 and Tr 24 are equal, and the circuit reaches equilibrium.

Then, the Tr 21 and Tr 22 are turned off at the time when the PSET signal rises, and both of the gates of the Tr 23 and Tr 24 float. Here, the difference between the voltage of the vertical signal line and the gate voltage of the Tr 23 is retained in the capacitor Cp 25, and the difference between the RAMP reference voltage and the gate voltage of the Tr 24 is retained in the capacitor Cp 26. After the auto-zero, the levels of the pixel signal and the RAMP side signal can be compared.

However, the comparator has problems as follows:

(1) First Problem

At the rising edge of the auto-zero pulse PSET signal, the switch transistors Tr 21 and Tr 22 are turned off. At the same time, feedthrough occurs between the gate and drain of each of the switch transistors. Due to the influence by the feedthrough, a difference occurs between the gate potentials of the Tr 23 and Tr 24. This is caused by the unequal loads across the comparator. The lateral asymmetry of the loads connecting to the comparator may be a cause of the difference due to the facts that the comparator output signal line is connected to the drain side of the Tr 22 and/or that the load of the RAMP signal line connecting to the Cp 26 is light while the load of the VSL connecting to the Cp 25 is significantly heavy, for example. The magnitude of the feedthrough strongly depends on the rising time of the PSET signal. An abrupt PSET signal rise increases the feedthrough more and causes a large difference between the gate voltage of the Tr 23 and the gate voltage of the Tr 24. In this circuit example, it is known that the gate voltage of the Tr 23 decreases more than the gate voltage of the Tr24 when feedthrough occurs after the auto-zero. If no feedthrough occurs, the gate voltage level of the Tr 23 positions substantially at the middle of that of the reset level detection ramp wave. Therefore, the counter counts about half (refer to the curve A in FIG. 16). However, if the gate potential of the Tr 23 is decreased by the feedthrough, the reset counts increases since the point of intersection with the reset detection ramp wave moves backward correspondingly (refer to the curve B in FIG. 16). If a large feedthrough occurs, the gate potential of the Tr 23 does not intersect with the reset level detection ramp wave (refer to the curve C in FIG. 16). In this case, the reset counter stops at the full code. However, the actual intersection has not been achieved, and the difference therefore becomes an error, which may deteriorate the image quality.

(2) Second Problem

FIG. 17 is a diagram showing the layout of the comparators at columns and the PSET signal generating circuit in the solid-state imaging apparatus. In the comparator 16 at a column near the reset signal generating section 19, a larger feed through occurs during the auto-zero. As the distance from the reset signal generating section 19 increases, the wiring resistance on the signal transmission path increases and the degree of dullness of the PSET pulses to be transmitted to the columns increases, which therefore decreases the amount of feedthrough to the columns. An abrupt rise of a PSET signal may increase the degree of dullness due to the signal transmission. Therefore, the reset counts largely differ among columns from end to end the ends of a column. In order to perform reset counting without an error at all columns against the factor and other variation factors, it is important for the sensor to take a longer reset count period (refer to FIG. 18).

SUMMARY OF THE INVENTION

A solid-state imaging apparatus and an imaging apparatus in the past may have the problems as described above in the comparator that compares a pixel signal and a reference signal, which may further cause problems of a counting error of reset levels and/or an increase in length of the reset period.

According to an embodiment of the present invention, there is provided a solid-state imaging apparatus including comparing means for comparing a pixel signal obtained by a pixel section and a reference signal the value of which varies in a stepwise manner, analog-digital converting means for outputting, as a digital value, the amount of time when the pixel signal and the reference signal change levels by the comparing means, reset signal generating means for generating a reset signal that triggers a reset operation to be input to the comparing means in order to adjust the reference in the analog-digital converting means, and waveform processing means provided between the reset signal generating means and the comparing means for increasing the degree of dullness of a waveform of the reset signal.

According to the embodiment of the invention, a large feedthrough occurring in the comparing means can be suppressed since a reset signal is input to the comparing means after increasing the degree of dullness of the rising edge of the reset signal in advance.

The comparing means may be provided at each column of the pixel section. The waveform processing means may use the load of a capacitor, the load of a resistance or a CMOS inverter.

The waveform processing means may use a CMOS inverter, and the numbers of P-channel MOS and N-channel MOS included in the CMOS inverter may differ.

The waveform processing means may use a CMOS inverter, and a switch for operation control may be provided in either P-channel MOS or N-channel MOS included in the CMOS inverter.

The waveform processing means may use the load of a wire provided between the reset signal generating means and the comparing means.

The waveform processing means may be configured to increase the load of a wire as the distance from the reset signal generating means decreases in a wiring path from the reset signal generating means to the comparing means.

The comparing means may be provided at each column of the pixel section, and the lengths of the wiring paths from the reset signal generating means to the comparing means at the columns may be equal.

The waveform processing means may use a capacitor within the comparing means.

This can eliminate the difference in magnitude between feedthroughs at the positions near and far from the reset signal generating means. Therefore, the reset count values do not significantly differ among columns from end to end.

According to another embodiment of the invention, there is provided an imaging apparatus including comparing means for comparing a pixel signal obtained by a pixel section and a reference signal the value of which varies in a stepwise manner, analog-digital converting means for outputting, as a digital value, the amount of time when the pixel signal and the reference signal change levels by the comparing means, reset signal generating means for generating a reset signal that triggers a reset operation to be input to the comparing means in order to adjust the reference in the analog-digital converting means, waveform processing means provided between the reset signal generating means and the comparing means for increasing the degree of dullness of a wave form of the reset signal, and control means for controlling at least the analog-digital converting means and the reset signal generating means.

According to the embodiment of the invention, a large feedthrough occurring in the comparing means can be suppressed since a reset signal is input to the comparing means after increasing the degree of dullness of the rising edge of the reset signal in advance.

Therefore, the embodiments of the invention have following effects. That is, a large feedthrough occurring in the comparing means can be suppressed, which results in the elimination of the occurrence of a large difference between a vertical signal line signal and a DAC reference signal during the auto-zero and the elimination of the counting error of vertical signal line reset levels. In addition, the length of the reset period can be reduced since a smaller reset count margin is only enough.

BRIEF DESCRIPTION OF THE DRAWINGS

FIG. 9 is a block diagram illustrating a waveform processing section using the load of a wire;

FIG. 10 is a block diagram illustrating a waveform processing section using wires having an equal length;

FIG. 14 is a timing chart for a CMOS sensor in the past;

FIG. 15 is a block diagram showing an example of a comparator in the past;

FIG. 16 is a diagram illustrating a state of a vertical signal line where feedthrough occurs.

FIG. 17 is a diagram illustrating wires between an auto-zero signal generating circuit and comparators at columns.

DESCRIPTION OF THE PREFERRED EMBODIMENTS

Figure 1:
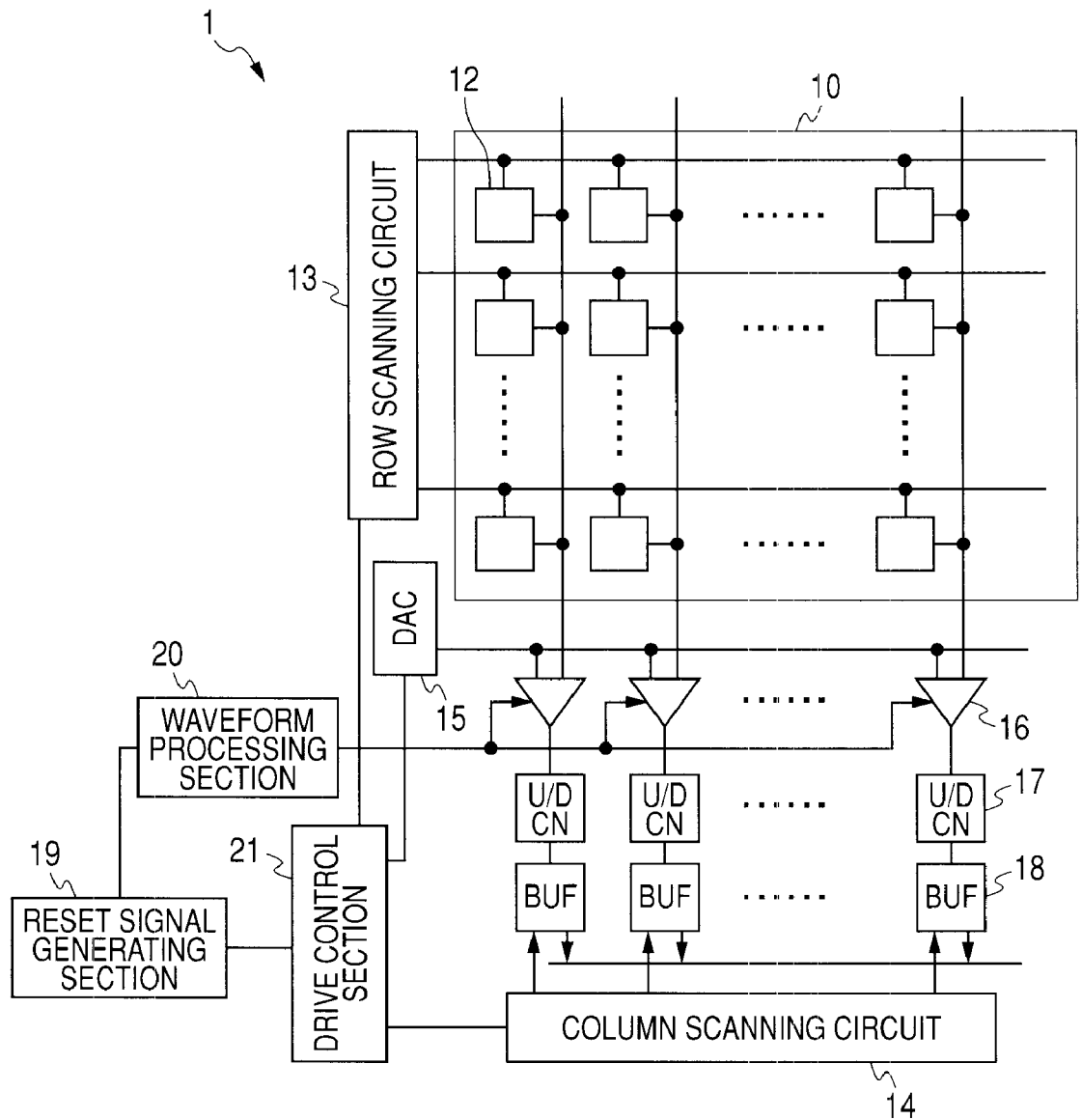
FIG. 1 is a block diagram illustrating a solid-state imaging apparatus according to an embodiment of the invention.

With reference to drawings, embodiments of the invention will be described below. FIG. 1 is a block diagram illustrating a solid-state imaging apparatus according to an embodiment of the invention. That is, a solid-state imaging apparatus 1 according to an embodiment of the invention includes a comparator (comparing means) 16 comparing a pixel signal obtained by a pixel array section 10 and a reference signal the value of which varies in a stepwise manner, an up/down counter (analog-digital converting means) 17 outputting, as a digital value, the amount of time when the pixel signal and the reference signal change levels by the comparator 16, a reset signal generating section (reset signal generating means) 19 generating a reset signal (auto-zero pulse signal) that triggers a reset operation to be input to the comparator 16 in order to adjust the reference in the up/down counter 17, and a waveform processing section (wave form processing means) 20 provided between the reset signal generating section 19 and the comparator 16 for increasing the degree of dullness of a waveform of the reset signal.

The pixel array section 10 has multiple unit pixels 12 in a matrix form. The unit pixels 12 are scanned in row directions by a row scanning circuit 13, and pixel signals are sequentially transmitted to the comparator 16. A reference signal to be compared with the pixel signal is input from a reference signal generating section (DAC) 15 to the comparator 16. The reference signal is a signal the level of which sequentially changes at predetermined intervals, and the comparator 16 detects the level at which the result of the comparison with a pixel signal inverts.

The time until the change of the levels of the pixel signal and the reference signal as a result of the comparison in the comparator 16 is measured by the up/down counter (U/D CN) 17, and the measured value is stored in the buffer (BUF) 18. Then, the values in the buffer 18 stored in columns are sequentially scanned and are output as signals by a column scanning circuit 14. The control over those components is performed by the drive control section 21.

In the solid-state imaging apparatus 1 of this embodiment as described above, the up/down counter 17 is used to remove a fixed pattern as in the past. First, during the D/A conversion at a reset level of a pixel, the counter counts minus levels. Next, during the D/A conversion when light is input, the counter counts plus levels from the count value as the starting point. Thus, the difference can be obtained in the digital area, without any subtractor circuit.

Here, a waveform processing section 20 provided between a reset signal generating section 19, which generates a reset signal (auto-zero pulse signal), and the comparator 16 is means for dulling the waveform of an auto-zero pulse signal. Thus, the occurrence of a feedthrough in the comparing circuit when the comparator 16 is reset can be suppressed, which provides an operational effect that can avoid the reading error of reset levels due to the shift of the reference value in the comparator 16, which is caused by the feedthrough.

In addition to the operational effect, the solid-state imaging apparatus 1 of this embodiment can reduce the differences in amount of the feedthrough among the comparators each provided at each column, which can reduce the differences in shift of the comparator reference values among the columns and eliminate the differences in reset count among the columns. Thus, the length of the reset count period can be reduced.

Figure 2:
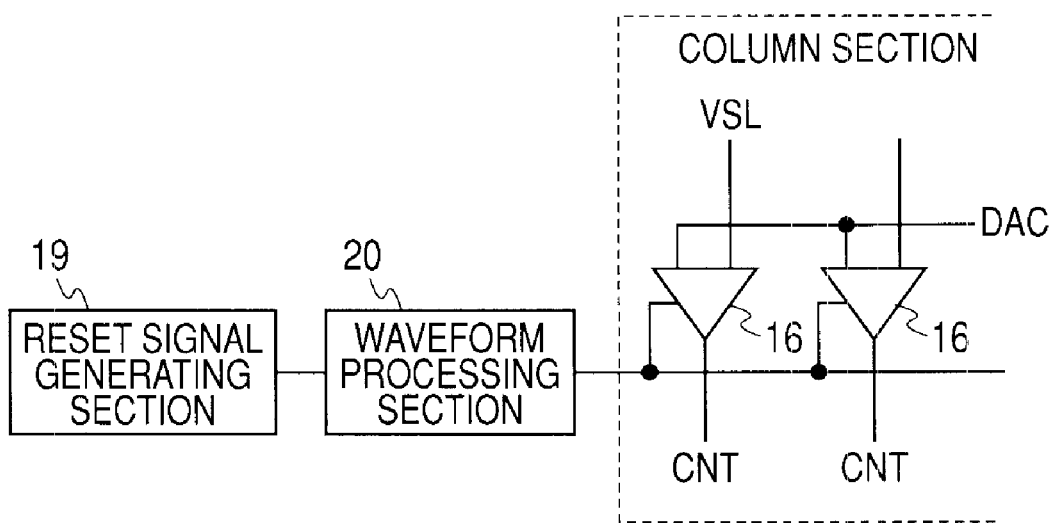
FIG. 2 is a block diagram showing means for increasing the degree of dullness of an auto-zero pulse by using a waveform processing section.

In other words, as shown in FIG. 2, the wave form processing section 20 is provided on a signal path from the reset signal generating section 19 to the auto-zero terminal of the comparators 16 at the columns and exerts the effect that dulls the rising edge of the auto-zero pulse signal waveform and can suppress the occurrence of a feedthrough in the comparators 16.

Notably, in the example shown in FIG. 2, one waveform processing section 20 is provided between the reset signal generating section 19 and the column section, but multiple waveform processing sections 20 may be provided therebetween. One or multiple waveform processing sections 20 may be provided for some columns, for example.

Figure 3:
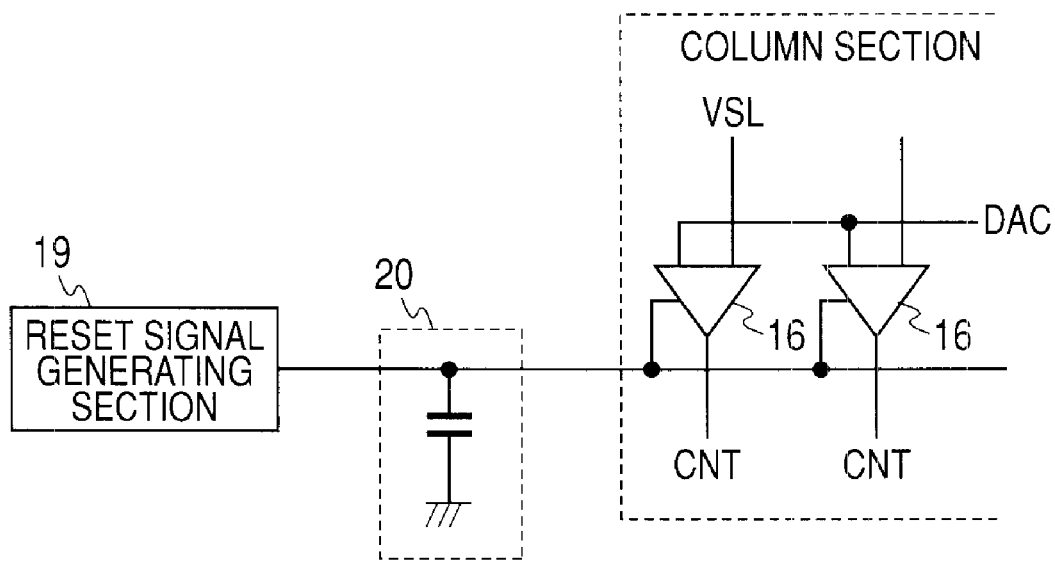
FIG. 3 is a block diagram illustrating a waveform processing section using a capacitor.

Various waveform processing sections 20 maybe considered. FIG. 3 shows an example using a capacitor as the waveform processing section. The rising edge of a signal waveform can be dulled according to the capacity of the capacitor, and the occurrence of a feedthrough in the comparators 16 can be suppressed. This example has the capacitor on the signal path, and the capacitor may be introduced to a circuit more easily. Also easily, a wire from the reset signal generating section 19 to the column section may be drawn out to the outside of the chip as a terminal, and an external capacitor can be connected thereto.

Figure 4:
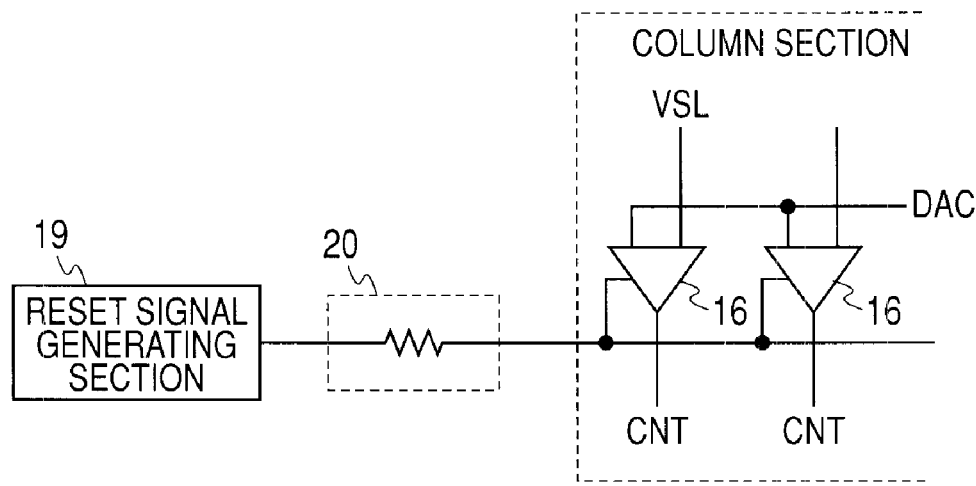
FIG. 4 is a block diagram illustrating a waveform processing section using a resistance.

In the example shown in FIG. 4, another example of the waveform processing section 20 uses a resistance. The resistance functions as a load on the path of an auto-zero pulse signal, which can also dull the rising edge of a signal waveform and suppress the occurrence of a feedthrough in the comparators 16, like the circuit using the capacitor. In the example using a resistance, the resistance can be implemented in a less area than that of the case where the capacitor circuit is provided therein.

Figure 5:
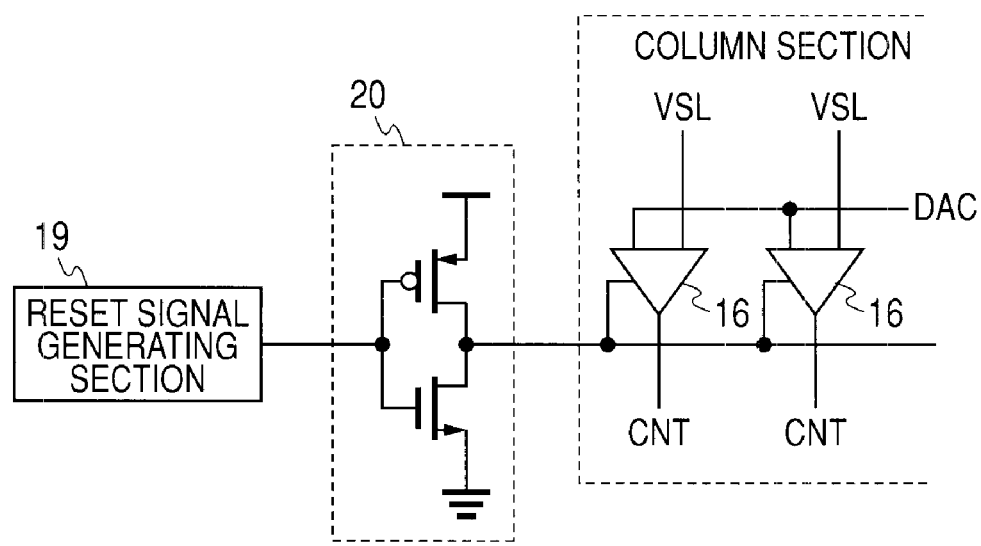
FIG. 5 is a block diagram (#1) illustrating a waveform processing section using a CMOS inverter.

FIG. 5 shows an example that a CMOS inverter is used as the waveform processing section 20. The use of a CMOS inverter can produce a waveform processing section that dulls one of the rising edge and the falling edge and does not dull the other by adjusting the length L (gate length) and width W (gate width) of each of a PMOS (positive MOS) and an NMOS (negative MOS) transistor. The CMOS inverter can also function as a load on the path of an auto-zero pulse signal and can dull the rising edge of a signal waveform and suppress the occurrence of a feedthrough in the comparators 16, like the circuit using the capacitor or resistance.

Here, in a case where a PMOS transistor is used to provide a comparator auto-zero switch, a feedthrough is caused at the rising edge of auto-zero pulses. Therefore, the waveform at the rising edge of auto-zero pulses may be dulled but does not have to be dulled at the falling edge.

In order to implement the function, the size of the PMOS transistor only may be increased in the CMOS inverter. In a case where an NMOS transistor is used to provide a comparator auto-zero switch, the size of the NMOS transistor in the inverter only may be increased such that only the waveform at the rising edge of auto-zero pulses can be dulled.

Figure 6:
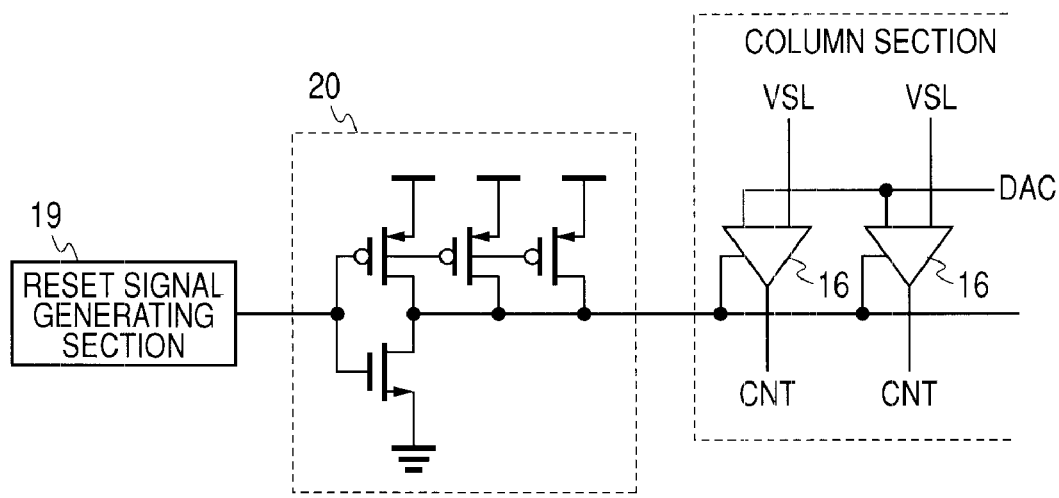
FIG. 6 is a block diagram (#2) illustrating a waveform processing section using a CMOS inverter.

FIG. 6 shows an example that the number of PMOS transistors is increased as an application of the case using a CMOS inverter as the waveform processing section 20. Three PMOS transistors and one NMOS transistor are shown, but the numbers may depend on the type of MOS of the comparator switch and/or the degree of dullness of auto-zero pulses. This can increase the degree of dullness of auto-zero pulses more than that by the circuit in FIG. 5.

Figure 7:
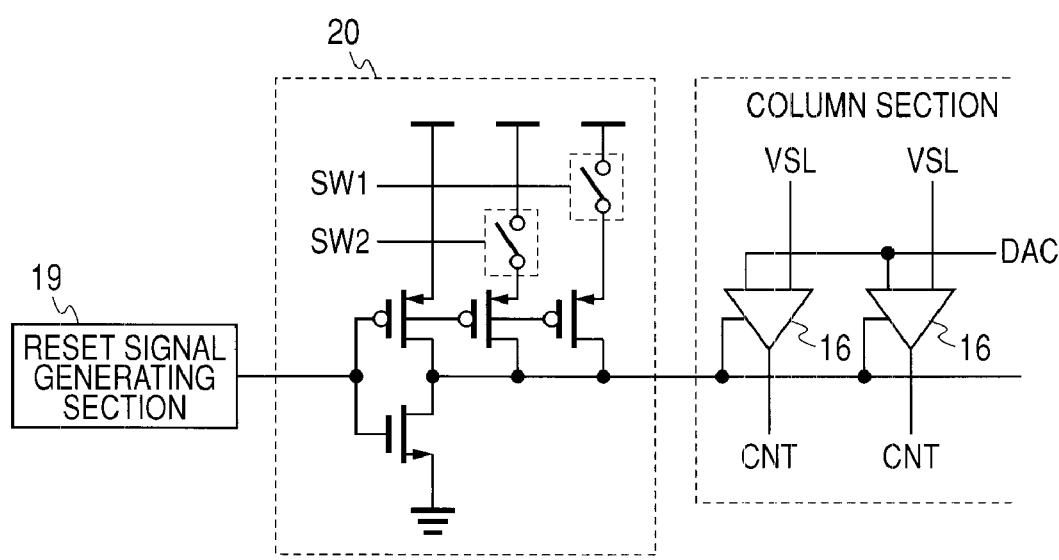
FIG. 7 is a block diagram (#3) illustrating a waveform processing section using a CMOS inverter.

FIG. 7 shows an application of the case using a CMOS inverter as the waveform processing section 20, which is a circuit that includes switches for PMOS transistors and can increase or decrease the number of PMOS transistors to activate and can thus freely change the degree of dullness of auto-zero pulses. This configuration can easily and dynamically change the degree of dullness of auto-zero pulses as necessary during a sensor operation. The example in FIG. 7 has three PMOS transistors and one NMOS transistor, but the numbers may depend on the type of MOS of comparator switches and/or the degree of dullness of auto-zero pulses.

Figure 8:
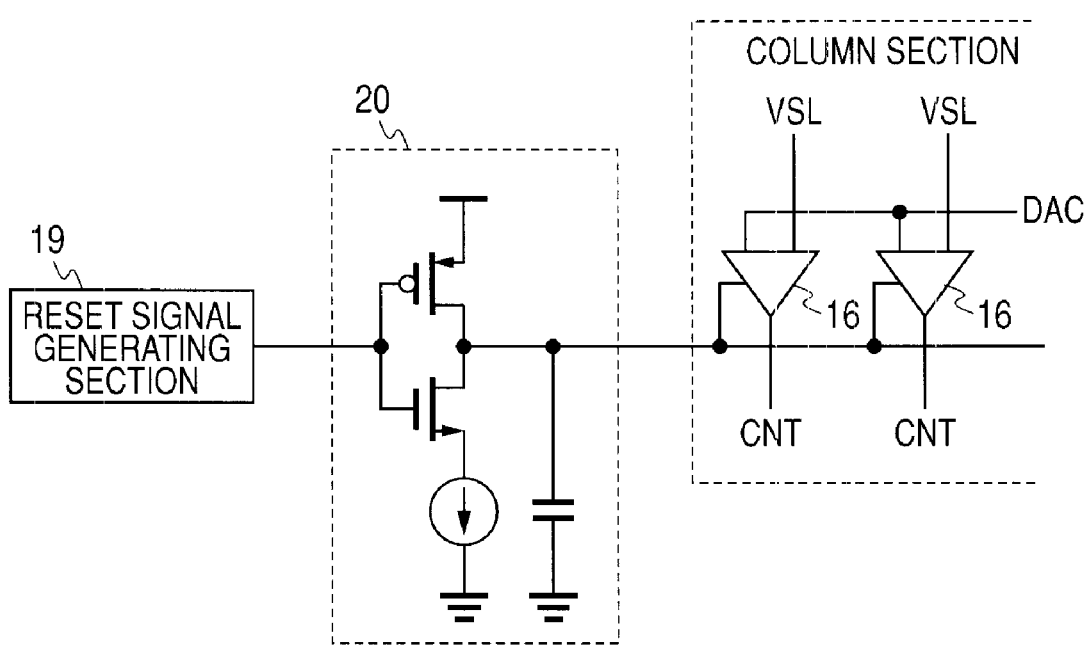
FIG. 8 is a block diagram illustrating a waveform processing section using a CMOS inverter that drives a current source.

FIG. 8 is an example in which the CMOS inverter is driven by a current source as the waveform processing section 20. The adjustment of the size of the current source can determine the amount of dullness of auto-zero pulse signals easily and in no stepwise manner. This circuit is also applicable to the system that changes auto-zero pulse signals dynamically.

FIG. 9 is a diagram showing means for dulling auto-zero pulses by providing means for increasing the load at a part or all of the signal path itself connected from the reset signal generating section 19 to the comparators 16 and 16' at the columns. In this circuit, a wire with a high load is used as the path to the comparator 16 at the columns near the reset signal generating section 19 while a wire with a normal load is used as the path to the comparator 16' at the columns far from the reset signal generating section 19. Thus, the difference in feedthrough among positions of columns can be reduced.

In order to increase the load, a member with a high load maybe used, or the width of the wire maybe changed, for example. Thus, this can be possibly introduced in a less space than that for the method that provides a circuit including a device as the waveform processing means.

FIG. 10 shows an example in which the lengths of the wires from the reset signal generating section 19 to the comparators 16 at the columns are equal. The connection with the wires in equal length can make the loads uniform in the wires from the reset signal generating section 19 to the comparators 16. Thus, the difference in feedthrough among the positions of the columns can be suppressed.

According to this embodiment, the waveform processing section may be implemented by increasing the driving load for the auto-zero switches within the comparators. For example, the gate sizes of the Tr 21 and Tr 22 shown in FIG. 15 may be increased to function as the waveform processing section, which can reduce the amount of feedthrough. The use of this means is effective in a case where a separate circuit may not be provided for waveform processing or the resolution with the wires may not be attempted.

Figure 11:
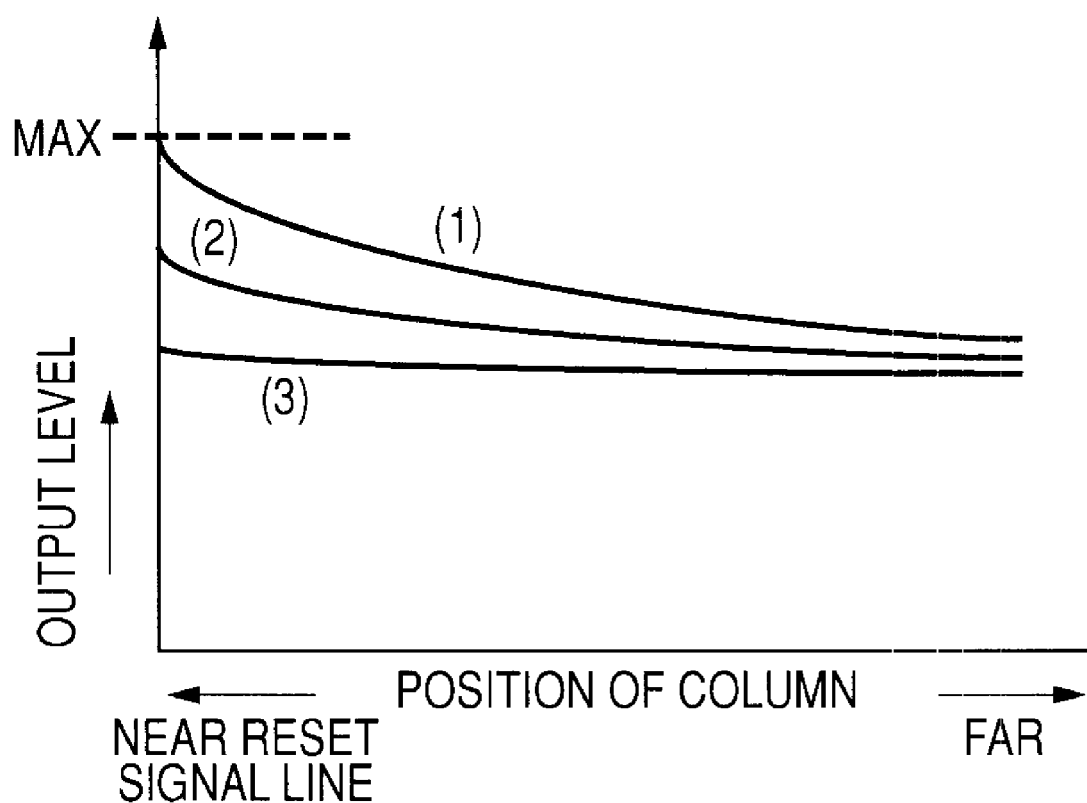
FIG. 11 is a diagram illustrating effects of a waveform processing section applicable in an embodiment of the invention.

FIG. 11 is a diagram illustrating effects of the waveform processing section applied in this embodiment. The horizontal axis expresses the distances of wires from the signal generating section to columns having the comparators, and the vertical axis expresses the output values of the reset level by the comparators.

In FIG. 11, the graph designated by (1) is for one without a waveform processing section (as in an example in the past), the graph designated by (2) is for a case where the auto-zero pulse signal is slightly dulled by using the waveform processing section of this embodiment, and the graph designated by (3) is for a case where the auto-zero pulse signal is dulled more than the case of (2).

In the case without a waveform processing section, as shown by the graph (1), the output values of the reset levels differ largely among the positions at short and long wiring distances from the signal generating section to the comparators. However, by using the waveform processing section, the difference in output of the reset levels can be reduced as shown in the graphs (2) and (3), and uniform reset levels can be achieved against the wiring distances from the signal generating section to the comparators.

Figure 12:
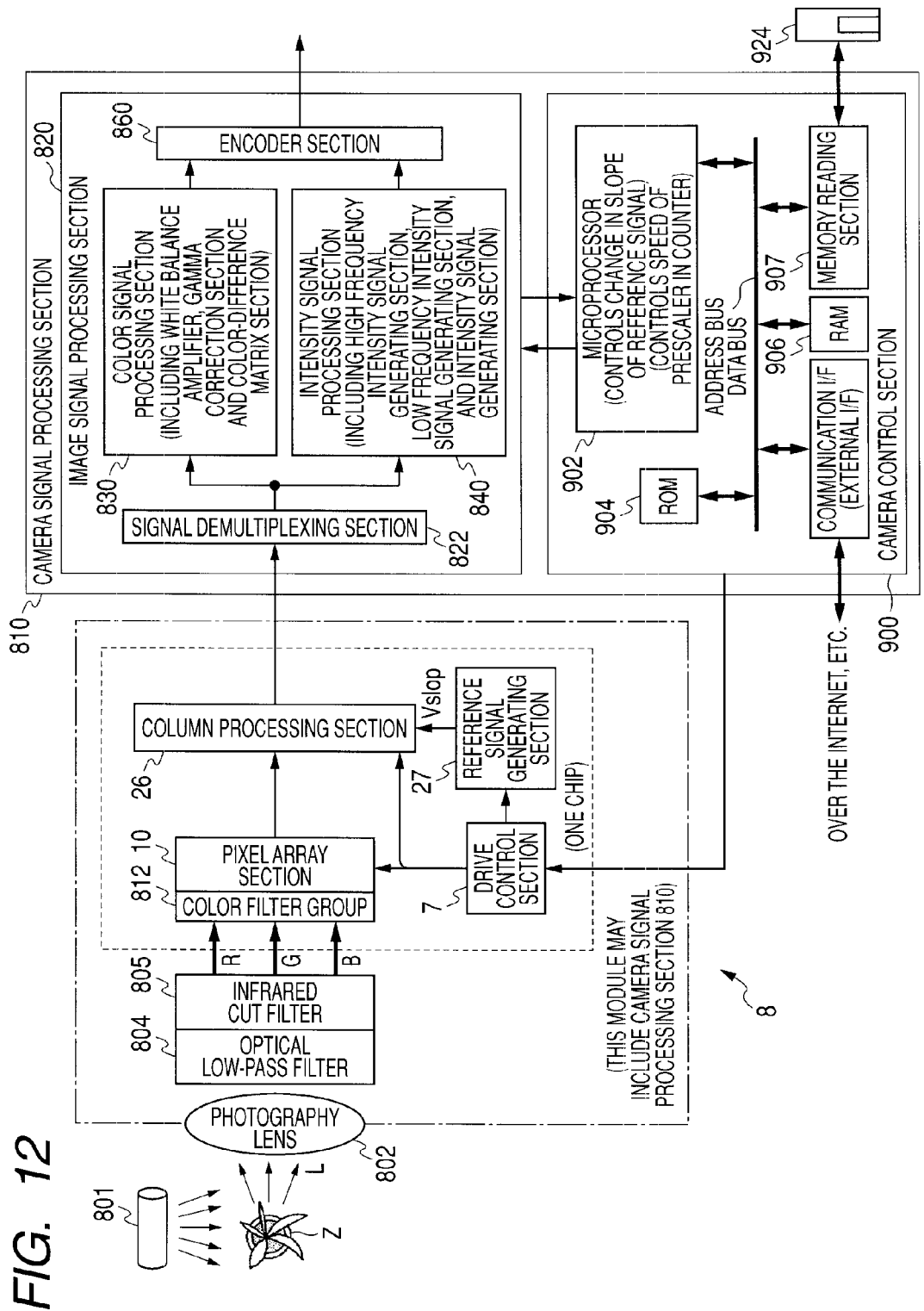
FIG. 12 is a block diagram illustrating an imaging apparatus.
Figure 13:
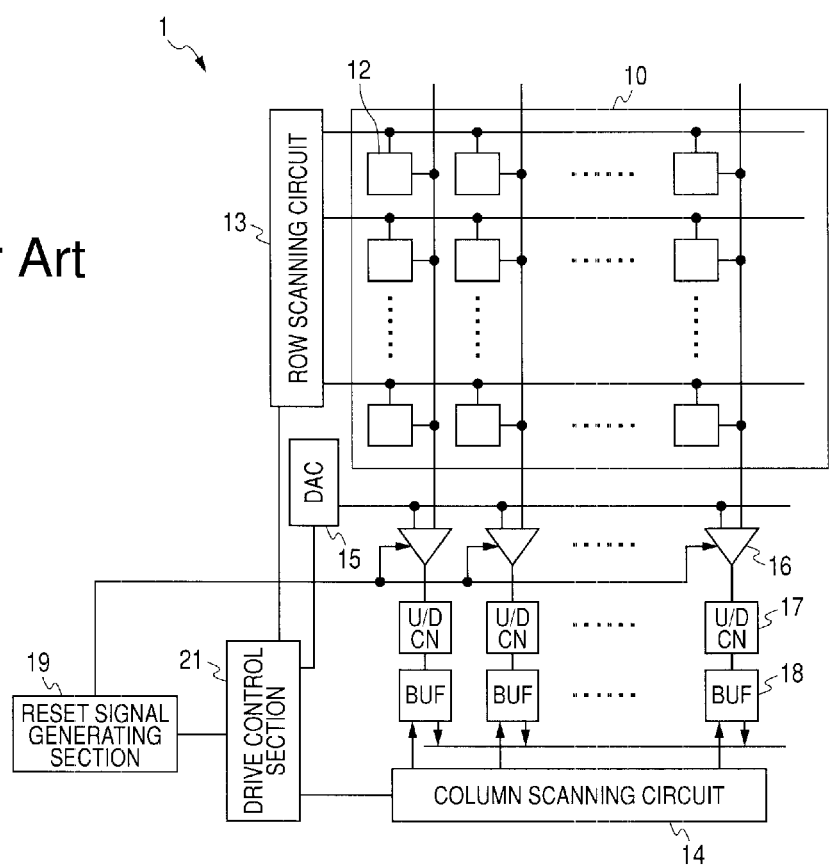
FIG. 13 is a block diagram showing an entire configuration example of a CMOS sensor in the past.
Figure 18:
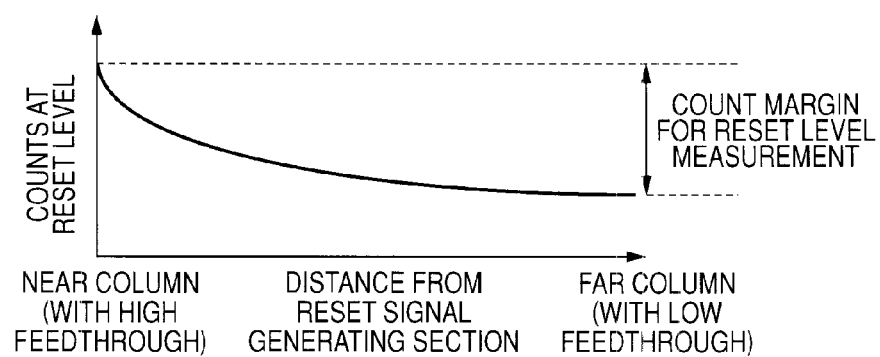
FIG. 18 is a diagram illustrating the distance between the auto-zero signal generating circuit and a column and the number of reset counts at the column.

Next, an imaging apparatus applying the solid-state imaging apparatus of this embodiment will be described. FIG. 12 is a configuration diagram illustrating an imaging apparatus applying the solid-state imaging apparatus. That is, an imaging apparatus 8 includes a photography lens 802, an optical low-pass filter 804, a color filter group 812, a pixel array section 10, a drive control section 7, a column processing section 26, a reference signal generating section 27 and a camera signal processing section 810. The photography lens 802 guides and forms onto the imaging apparatus side an image of light L supporting an image of a subject Z under an illumination device 801 such as a fluorescent light. The color filter group 812 has R, G and B color filters in the Bayer pattern. The drive control section 7 drives the pixel array section 10. The column processing section 26 performs CDS processing or AD conversion processing on a pixel signal output from the pixel array section 10. The reference signal generating section 27 supplies a reference signal Vslop to the column processing section 26. The camera signal processing section 810 processes an image signal output from the column processing section 26.

The optical low-pass filter 804 may be used for blocking a frequency component equal to or higher than the Nyquist frequency in order to prevent aliasing distortions. As indicated by the broken line in FIG. 12, an infrared cut filter 805 that reduces an infrared component can be provided in addition to the optical low-pass filter 804. This point is the same as in a general imaging apparatus.

The camera signal processing section 810 provided after the column processing section 26 has an image signal processing section 820, and a camera control section 900 functioning as a main control section that controls the entire imaging apparatus 8.

The image signal processing section 820 has a signal demultiplexing section 822 and a color signal processing section 830. The signal multiplexing section 822 has a primary color demultiplexing function that demultiplexes a digital image signal supplied from the AD conversion functioning section of the column processing section 26 into primary color signals R (red), G (green) and B (blue) when a color filter excluding a primary color filter is used. The color signal processing section 830 performs signal processing on a color signal C based on the primary color signals R, G and B demultiplexed by the signal demultiplexing section 822.

The image signal processing section 820 further has an intensity signal processing section 840 and an encoder section 860. The intensity signal processing section 840 performs signal processing on an intensity signal Y based on primary color signals R, G and B demultiplexed by the signal demultiplexing section 822. The encoder section 860 generates a video signal VD based on the intensity signal Y/color signal C.

The color signal processing section 830 has a white balance amplifier, a gamma correcting section, and a color difference matrix section, not shown, for example. The white balance amplifier adjusts the gains of the primary color signals supplied from a primary color demultiplexing function section of the signal multiplexing section 822 based on the gain signal supplied from a white balance controller, not shown (white balance adjustment) and supplies the result to the gamma correcting section and intensity signal processing section 840.

The gamma correcting section performs gamma (γ) correction for faithfully reproducing the colors based on the primary color signals with an adjusted white balance and inputs output signals R, G and B for the gamma corrected colors to the color difference matrix section. The color difference matrix section inputs color difference signals R-Y and B-Y obtained by performing color-difference matrix processing thereon to the encoder section 860.

The intensity signal processing section 840 has a high-frequency intensity signal generating section, a low-frequency intensity signal generating section and an intensity signal generating section, not shown, for example. The high-frequency intensity signal generating section generates an intensity signal YH even including a higher frequency component based on the primary color signals supplied from the primary color demultiplexing function section of the signal demultiplexing section 822. The low-frequency intensity signal generating section generates an intensity signal YL only including a lower frequency component based on the primary color signals with an adjusted white balance, which is supplied from the white balance amplifier. The intensity signal generating section generates an intensity signal Y based on the two types of intensity signal YH and YL and supplies them to the encoder section 860.

The encoder section 860 digitally modulates the color difference signals R-Y and B-Y with the digital signal corresponding to a color signal sub-carrier and then synthesizes the result with the intensity signal Y generated in the intensity signal processing section 840 and converts the result to a digital video signal VD (=Y+S+C, where S is a synchronization signal, and C is a chroma signal).

The digital video signal VD output from the encoder section 860 is supplied to a subsequent camera signal output section, not shown, for monitor output or data recording to a recording medium, for example. In this case, the digital video signal VD is converted to an analog video signal V by DA conversion as necessary.

The camera control section 900 of this embodiment has a microprocessor 902, a ROM (read only memory) 904, a RAM (random access memory) 906 and other peripheral members, not shown. The microprocessor 902 functions as the center of an electronic computer typically such as a CPU (central processing unit) having both operation and control functions to be performed by a computer in an ultra-small scale integrated circuit. The ROM 904 is a read-only storage section. The RAM 906 is an example of the volatile storage section, which is writable/readable as necessary. The microprocessor 902, ROM 904, and RAM 906 will be also collectively called microcomputer.

The expression, "volatile storage section" refers to a storage section in a form in which stored data disappears when the device is powered off. On the other hand, the expression, "non-volatile storage section" refers to a storage section in a form in which stored data is kept retained even when the main power of the device including it is turned off. It is only important for the non-volatile memory to retain stored data, and the non-volatile memory is not limited to those in which a semiconductor memory element itself is non-volatile. A volatile memory element may be configured to exhibit the non-volatility by having a backup power supply.

A medium such as a magnetic disk and an optical disk may be used for the configuration, without limiting to the configuration with a semiconductor memory element. For example, a hard disk device may be used as the non-volatile storage section. The non-volatile storage section can also be implemented by adopting the configuration that reads information from a recording medium such as a CD-ROM.

The camera control section 900 controls the entire system and has a function of adjusting the ON/OFF timing of control pulses for controlling a change in slope of a reference signal Vslop in the reference signal generating section 27 or controlling the speed of a prescaler in the counter section 254 particularly in order to increase the speed of the AD conversion processing as described above.

The ROM 904 stores a control program for the camera control section 900, for example, and, particularly in this embodiment, stores a program for defining the ON/OFF timing of control pulses by the camera control section 900.

The RAM 906 stores data to be used by the camera control section 900 for performing processing.

The camera control section 900 is configured to allow the removable attachment of a recording medium 924 such as a memory card thereto and is configured to be connectable to a communication network such as the Internet. For example, the camera control section 900 further has a memory reading section 907 and a communication I/F (interface) 908, in addition to the microprocessor 902, ROM 904 and RAM 906.

For example, the recording medium 924 may used for registering program data for causing the microprocessor 902 to perform software processing or data including various set values for the convergence range of measured light data DL or light-exposure control processing (including control over an electronic shutter) based on intensity-based signal from the intensity signal processing section 840 and the ON/OFF timing for control pulses for controlling the change in slope of a reference signal Vslop in the reference signal generating section 27 and controlling the speed of a prescaler in the counter section 254.

The memory reading section 907 stores (installs) the data read out from the recording medium 924 to the RAM 906. The communication I/F 908 mediates the exchange of communication data with a communication network such as the Internet.

In the imaging apparatus 8, the drive control section 7 and column processing section 26 are provided in a module separately from the pixel array section 10. However, it is apparent, as described regarding the solid-state imaging apparatus 1, that the solid-state imaging apparatus 1 may be used which is in a one chip form having those components on the same semiconductor substrate as that of the pixel array section 10.

FIG. 12 shows the imaging apparatus 8, which may include the optical system such as the photography lens 802, the optical low-pass filter 804 and the infrared cut filter 805 in addition to the pixel array section 10, drive control section 7, column processing section 26, reference signal generating section 27 and camera signal processing section 810. The form is suitable in a case where those components are collectively packaged in a module form.

Describing the relationship with the module in the solid-state imaging apparatus 1, the solid-state imaging apparatus 1 may be provided in a module form having an imaging function with the package collectively including the pixel array section 10 (imaging section) and a signal processing section (excluding the camera signal processing section after the column processing section 26) tightly related to the pixel array section 10, such as the column processing section 26 having an AD conversion function and a difference (CDS) processing function, as shown in FIG. 12. Then, the entire imaging apparatus 8 may be provided by providing the camera signal processing section 810, which is the remaining signal processing section, after the solid-state imaging apparatus 1 provided in the module form.

Alternatively, the solid-state imaging apparatus 1 may be provided in a module form having a package collectively including the pixel array section 10 and the optical system such as the photography lens 802 and then having an imaging function. Then, the entire imaging apparatus 8 may be provided by providing the camera signal processing section 810 also within the module in addition to the solid-state imaging apparatus 1 provided in the module form.

The module form in the solid-state imaging apparatus 1 may include the camera signal processing section 810 corresponding to the camera signal processing section 200. In this case, the solid-state imaging apparatus 1 and the imaging apparatus 8 can be regarded as the same in reality.

The imaging apparatus 8 may be provided as a camera or a mobile unit having an imaging function, for example, for performing "imaging". The term, "imaging" includes not only capture of an image in normal camera photographing but also detection of a fingerprint in a broad sense.

The imaging apparatus 8 in the configuration includes all functions of the solid-state imaging apparatus 1 and has the same basic configuration and operations as those of the solid-state imaging apparatus 1.

For example, the program that causes a computer to perform the processing as described above may be distributed through the recording medium 924 such as a non-volatile semiconductor memory card such as a flash memory, an IC card and a Miniature card. Alternatively, the program may be obtained or updated by downloading from a server over a communication network such as the Internet.

A semiconductor memory such as an IC card and a Miniature card, which is an example of the recording medium 924, may store a part or all of functions of the processing in the solid-state imaging apparatus 1, which has described in the description of the embodiments above. Therefore, a program or a storage medium storing the program can be provided.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging apparatus comprising:
   comparing means for comparing a pixel signal obtained by a pixel section and a reference signal the value of which varies in a stepwise manner;
   analog-digital converting means for outputting, as a digital value, the amount of time when the pixel signal and the reference signal change levels by the comparing means;
   reset signal generating means for generating a pulse reset signal that triggers a reset operation of the comparing means in order to adjust the reference in the analog-digital converting means; and
   waveform processing means provided between the reset signal generating means and a reset signal input of the comparing means for increasing the degree of dullness of a waveform of the reset signal, the increase in dullness meaning an increase in rise and fall times of the pulse reset signal.

2. The solid-state imaging apparatus according to claim 1, wherein the comparing means is provided at each column of the pixel section.

3. The solid-state imaging apparatus according to claim 1, wherein the waveform processing means uses the load of a capacitor.

4. The solid-state imaging apparatus according to claim 1, wherein the waveform processing means uses the load of a resistance.

5. The solid-state imaging apparatus according to claim 1, wherein the waveform processing means uses a CMOS inverter.

6. The solid-state imaging apparatus according to claim 1, wherein the waveform processing means uses a CMOS inverter; and
   the numbers of P-channel MOS and N-channel MOS included in the CMOS inverter differ.

7. The solid-state imaging apparatus according to claim 1, wherein the waveform processing means uses a CMOS inverter; and
   a switch for operation control is provided in either P-channel MOS or N-channel MOS included in the CMOS inverter.

8. The solid-state imaging apparatus according to claim 1, wherein the waveform processing means uses a CMOS inverter; and
   the CMOS inverter drives a direct current source.

9. The solid-state imaging apparatus according to claim 1, wherein the waveform processing means uses the load of a wire provided between the reset signal generating means and the comparing means.

10. The solid-state imaging apparatus according to claim 1, wherein the waveform processing means is configured to increase the load of a wire as the distance from the reset signal generating means decreases in a wiring path from the reset signal generating means to the comparing means.

11. The solid-state imaging apparatus according to claim 1, wherein the comparing means is provided at each column of the pixel section; and
    the lengths of the wiring paths from the reset signal generating means to the comparing means at the columns are equal.

12. The solid-state imaging apparatus according to claim 1, wherein the waveform processing means uses a capacitor within the comparing means.

13. An imaging apparatus comprising:
    comparing means for comparing a pixel signal obtained by a pixel section and a reference signal the value of which varies in a stepwise manner;
    analog-digital converting means for outputting, as a digital value, the amount of time when the pixel signal and the reference signal change levels by the comparing means;

reset signal generating means for generating a pulse reset signal that triggers a reset operation of the comparing means in order to adjust the reference in the analog-digital converting means;

waveform processing means provided between the reset signal generating means and a reset signal input of the comparing means for increasing the degree of dullness of a waveform of the reset signal, the increase in dullness meaning an increase in rise and fall times of the pulse reset signal; and control means for controlling at least the analog-digital converting means and the reset signal generating means.

14. A solid-state imaging apparatus comprising:

a comparing section comparing a pixel signal obtained by a pixel section and a reference signal the value of which varies in a stepwise manner;

an analog-digital converting section outputting, as a digital value, the amount of time when the pixel signal and the reference signal change levels by the comparing section;

a reset signal generating section generating a pulse reset signal that triggers a reset operation of the comparing section in order to adjust the reference in the analog-digital converting section; and a waveform processing section provided between the reset signal generating section and a reset signal input of the comparing section, the waveform processing section increasing the degree of dullness of a waveform of the reset signal, the increase in dullness meaning an increase in rise and fall times of the pulse reset signal.

15. An imaging apparatus comprising:

a comparing section comparing a pixel signal obtained by a pixel section and a reference signal the value of which varies in a stepwise manner;

an analog-digital converting section outputting, as a digital value, the amount of time when the pixel signal and the reference signal change levels by the comparing section;

a reset signal generating section generating a pulse reset signal that triggers a reset operation of the comparing section in order to adjust the reference in the analog-digital converting section;

a waveform processing section provided between the reset signal generating section and a reset signal input of the comparing section, the waveform processing section increasing the degree of dullness of a waveform of the reset signal, the increase in dullness meaning an increase in rise and fall times of the pulse reset signal; and a control section controlling at least the analog-digital converting section and the reset signal generating section.

* * * * *